(12) United States Patent
Miller

(10) Patent No.: US 7,124,656 B2
(45) Date of Patent: Oct. 24, 2006

(54) GIMBAL MECHANISM

(76) Inventor: Jerry J. Miller, 80 Georgia, Big Bear Lake, CA (US) 92315

( * ) Notice: Subject to any disclaimer, the term of this patent is extended or adjusted under 35 U.S.C. 154(b) by 225 days.

(21) Appl. No.: 10/942,541

(22) Filed: Sep. 16, 2004

(65) Prior Publication Data

US 2006/0053912 A1   Mar. 16, 2006

(51) Int. Cl.
  *G01C 19/24* (2006.01)
  *G01C 19/44* (2006.01)

(52) U.S. Cl. ............................................ 74/5.1; 74/5.8

(58) Field of Classification Search .................. 74/5 R, 74/5.1, 5.22, 5.34, 5.8, 5.9, 5 F
See application file for complete search history.

(56) References Cited

U.S. PATENT DOCUMENTS

| | | | |
|---|---|---|---|
| 2,615,961 A * | 10/1952 | Means ......................... | 324/254 |
| 2,969,681 A * | 1/1961 | Beasley ........................ | 74/5.4 |
| 3,002,097 A * | 9/1961 | Nuut ........................ | 250/203.6 |
| 3,226,986 A * | 1/1966 | Rafferty ...................... | 74/5.41 |
| 3,368,411 A * | 2/1968 | Sann ............... | 74/5.4 |
| 3,616,699 A * | 11/1971 | Brand ......................... | 74/502 |
| 3,617,016 A | 11/1971 | Bolsey | |
| 4,270,387 A * | 6/1981 | Hoffman ................... | 73/504.07 |
| 4,352,023 A * | 9/1982 | Sachs et al. .................. | 290/42 |
| 4,615,590 A | 10/1986 | Alvarez et al. | |
| 4,780,739 A | 10/1988 | Kawakami et al. | |
| 4,788,596 A | 11/1988 | Kawakami et al. | |
| 4,855,838 A | 8/1989 | Jones et al. | |
| 4,856,882 A | 8/1989 | Oshima et al. | |
| 5,117,246 A | 5/1992 | Takahashi et al. | |
| 5,313,850 A * | 5/1994 | Finvold et al. ................ | 74/5.9 |
| 5,502,598 A | 3/1996 | Kimura et al. | |
| 5,619,195 A | 4/1997 | Allen et al. | |
| 5,637,861 A | 6/1997 | Okada et al. | |
| 5,734,932 A | 3/1998 | Washisu | |
| 5,761,545 A | 6/1998 | Tanaka et al. | |
| 5,774,179 A | 6/1998 | Chevrette et al. | |
| 5,774,266 A | 6/1998 | Otani et al. | |
| 5,842,053 A | 11/1998 | Ueyama et al. | |
| 5,915,275 A * | 6/1999 | Cardarelli et al. ....... | 73/504.03 |
| 5,953,544 A | 9/1999 | Kai et al. | |
| 6,202,968 B1 | 3/2001 | Lehr | |
| 6,536,724 B1 | 3/2003 | Furuta | |
| 6,609,690 B1 | 8/2003 | Davis | |
| 6,708,943 B1 | 3/2004 | Ursan | |
| 6,859,751 B1 * | 2/2005 | Cardarelli ................... | 702/141 |
| 2002/0154223 A1 | 10/2002 | Moriya | |

* cited by examiner

*Primary Examiner*—Tisha Lewis
(74) *Attorney, Agent, or Firm*—Stetina Brunda Garred & Brucker

(57) ABSTRACT

Provided is a gimbal mechanism comprising a support stand, an outer frame and an inner frame. The support stand includes a spaced pair of L-shaped legs comprising a first member having at least one first slot formed therethrough. The outer frame is nested within the support stand and comprises outer frame sides joined to outer frame ends. Each one of the outer frame sides is pivotally engagable to the first slot of an adjacent one of the first members such that the outer frame is selectively angularly and laterally positionable relative to the support stand. The inner frame is nested within the outer frame and comprises inner frame ends joined to inner frame sides. Each one of the inner frame ends is pivotally engagable to an adjacent one of the outer frame ends such that the inner frame is selectively angularly adjusted relative to the outer frame about an inner frame axis.

21 Claims, 4 Drawing Sheets

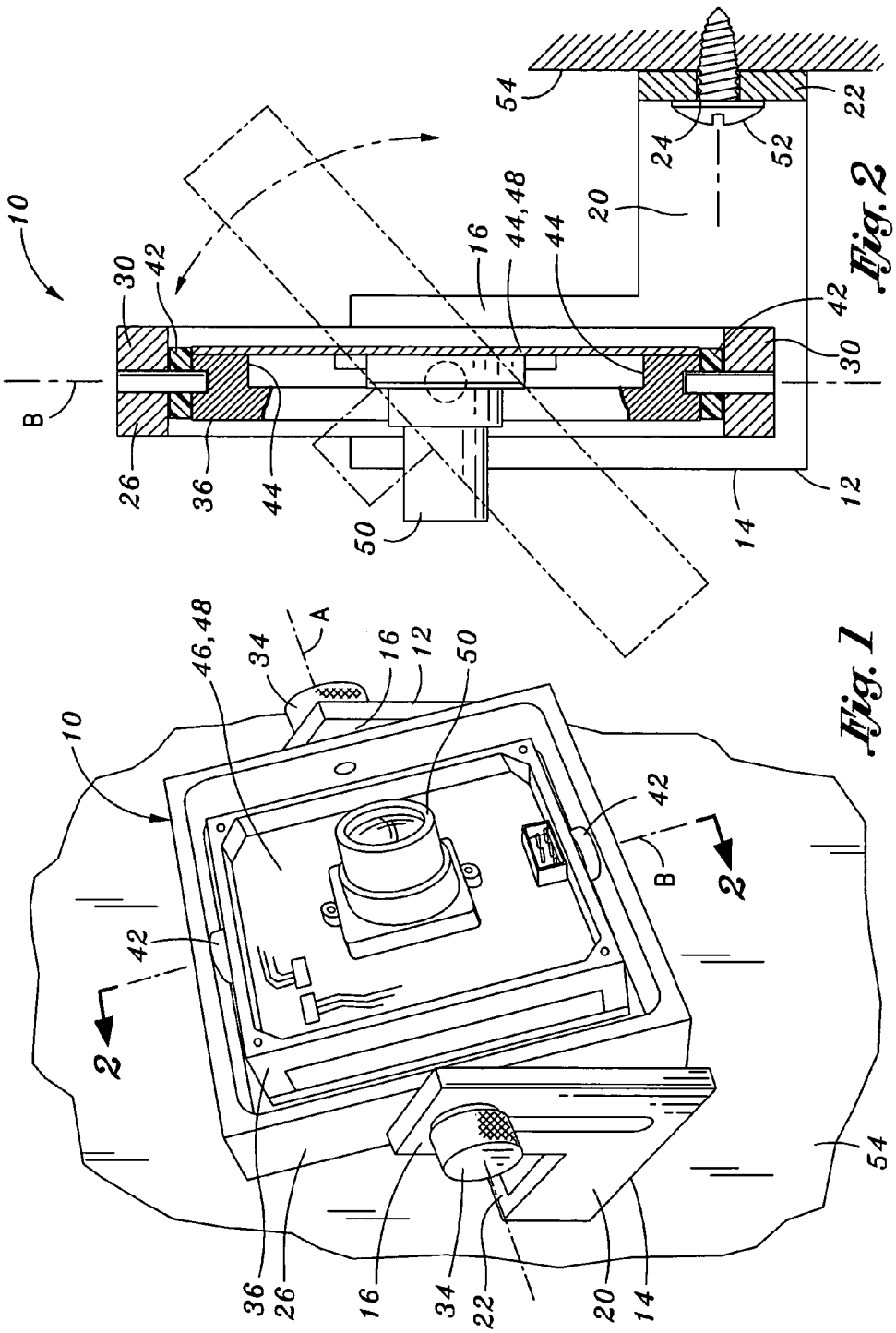

GIMBAL MECHANISM

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to camera mounting systems and, more particularly, to a uniquely configured gimbal mechanism such as may be used to mount a surveillance camera and which is specifically adapted to be angularly positionable about multiple axes of orientation as well as laterally positionable relative to a mounting surface upon which the gimbal mechanism may be mounted.

As a deterrent to crime, many residential and commercial buildings incorporate various security measures such as surveillance cameras which allow for remote detection, observation and recording of activity in a given area inside or outside of the building. One of the critical factors in the effectiveness of such surveillance cameras is the accuracy with which such cameras are directed toward areas where suspicious activity is likely to occur.

For example, in department stores, it is common practice to openly display goods in order to attract customers. Unfortunately, the open display of retail goods may result in a relatively high rate of theft from customers as well as from store personell. Strategically placed closed-circuit surveillance cameras enable security personnel to monitor suspicious activity and to apprehend shoplifters before actual loss of store merchandise, but only if the suspicious activity is within the field of view of the camera.

Included in the prior art are several gimbal mechanisms for surveillance cameras that provide automted adjustment of the orientation of the camera in a three-hundred-sixty degree field of view such that the camera covers a relatively broad area. In addition, zoom capability may be included with the surveillance camera in order to allow for surveillance of areas at high resolution. Unfortunately, for situations where a relatively narrow field of view is required, the capability of such automated gimbal mechanisms is underutilized. For example, in a retail situation where the area under surveillance is limited to the area surrounding a cash register, the use of an automated gimbal mechanism is not cost effective.

Fixed gimbal mechanisms may be used in areas where the area under surveillance is relatively small. Included in the prior art are several fixed gimbal mechanisms that allow for manual adjustment of the orientation of the camera. For example, one such prior art gimbal mechanism is comprised of several components each having a set of relatively intricate surface features that are formed on the components for maintaining the relative positions of the components once they are adjusted to a desired orientation. Unfortunately, such intricate surface features necessitate the use of precision machining or fabrication techniques. Such gimbal mechanisms are therefore costly and time-consuming to manufacture.

As can be seen, there exists a need in the art for a gimbal mechanism which is easily adjustable over a wide field of view. In addition, there exists a need in the art for a gimbal mechanism that is of simple construction and which has a relatively small number of components. Furthermore, there exists a need in the art for a gimbal mechanism that is of low cost to manufacture, assemble and maintain. Finally, there exists a need in the art for a gimbal mechanism that is of relatively compact design such that the gimbal can be covertly mounted in confined areas.

BRIEF SUMMARY OF THE INVENTION

Provided is a gimbal mechanism which is adapted to be angularly positionable about multiple axes of orientation as well as laterally positionable relative to a mounting surface upon which the gimbal mechanism may be mounted. The gimbal mechanism may be used to mount a variety of objects such as a surveillance camera lens such that the camera lens is easily adjustable over a wide field of view.

The gimbal mechanism is comprised of a support stand, an outer frame and an inner frame. The support stand may be mounted to the mounting surface such as a wall or a ceiling of a building. The outer frame is nested within and is pivotally mounted to the support stand. The inner frame is nested within and is pivotally mounted to the outer frame. A substrate, such as a circuit board having a camera lens, may be fixedly mounted to the inner frame. The gimbal mechanism is configured such that the inner frame is pivotable about an axis that is oriented perpendicularly to an axis about which the outer frame is pivotable.

The support stand may comprise a pair of spaced apart legs. Each one of the legs may comprise an elongate first member having an elongate second member extending laterally outwardly from the first member. Each one of the first members may have at least one first slot formed therethrough and which may extend along a length of the first member although the first members may include any number of the first slots. The gimbal mechanism further comprises the square shaped outer frame which is nested within the support stand. The outer frame is comprised of a spaced pair of outer frame sides which may be integrally formed with a spaced pair of outer frame ends. Each one of the outer frame sides is pivotally engageable to the first slot of an adjacent one of the first members such that the outer frame may be selectively angularly positioned relative to the support stand about an outer frame axis. The outer frame is configured to be slidable within the length of the first slots in order to allow the outer frame to be laterally positionable along the length of the first slots.

The gimbal mechanism further comprises the square shaped inner frame which is nested within the outer frame. The inner frame has a spaced pair of inner frame ends which may be integrally formed with a spaced pair of inner frame sides. Each one of the inner frame ends is pivotally engageable to an adjacent one of the outer frame ends such that the inner frame may be selectively angularly adjusted relative to the outer frame about an inner frame axis. The inner frame axis is oriented perpendicularly relative to the outer frame axis.

The outer frame may be pivotally connected to the support stand by a pair of mechanical fasteners such as a thumbscrew which extends through the first slots and engages a threaded hole in the outer frame sides. The thumbscrews are operative to cause slight relative axial motion between at least one of the first members and the adjacent one of the outer frame sides in order to facilitate frictional engagement of the first members to the outer frame sides in order to maintain or lock the angular and lateral position of the outer frame relative to the support stand. A pair of pivot mechanisms may connect at least one of the inner frame ends with an adjacent one of the outer frame ends in order to maintain the desired angular position of the inner frame relative to the outer frame.

The gimbal mechanism may include a base member extending between the second members. The base member may include a pair of base slots extending along a length of the base member. The base slots facilitate mounting of the gimbal mechanism to the mounting surface in such a manner as to facilitate lateral positioning of the gimbal mechanism relative to the mounting surface.

BRIEF DESCRIPTION OF THE DRAWINGS

These as well as other features of the present invention will become more apparent upon reference to the drawings wherein:

FIG. 1 is a perspective view of the gimbal mechanism of the present invention;

FIG. 2 is a cross-sectional side view of the gimbal mechanism and illustrating the mounting thereof to a mounting surface;

DETAILED DESCRIPTION OF THE INVENTION

Figure 3:
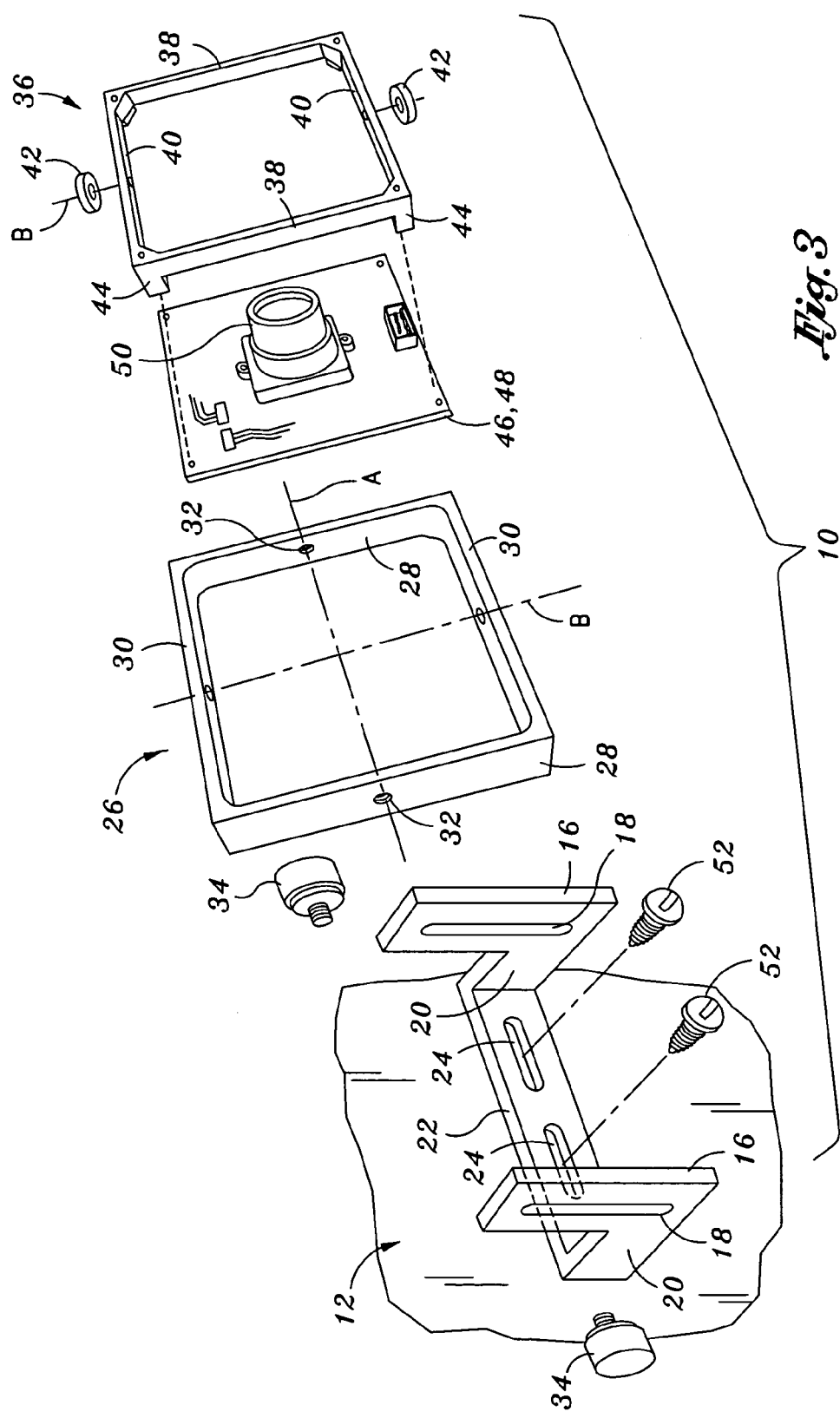
FIG. 3 is an exploded perspective view of the gimbal mechanism and illustrating the interconnectivity of a support stand, an outer frame and an inner frame that make up the gimbal mechanism.
Figure 5:
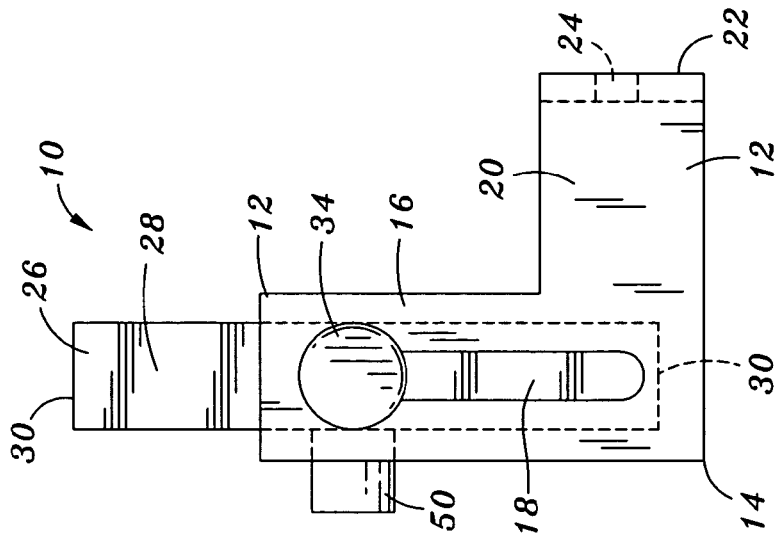
FIG. 5 is a side view of the gimbal mechanism and illustrating a first member of the support stand and further illustrating a first slot formed in each one of the base members for laterally positioning the outer frame relative to the support stand.
Figure 4:
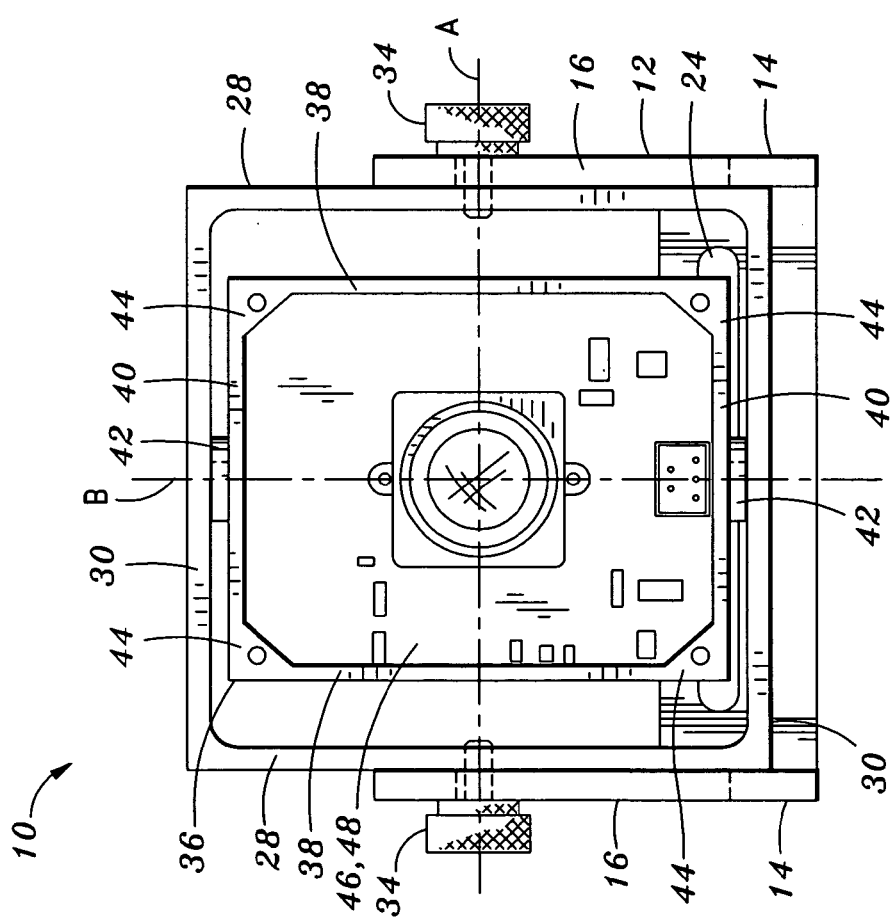
FIG. 4 is a front view of the gimbal mechanism and illustrating a base member of the support stand and further illustrating base slots formed in the base member for laterally positioning the gimbal mechanism relative to the mounting surface.

Referring now to the drawings wherein the showings are for purposes of illustrating the present invention and not for purposes of limiting the same, shown in FIGS. 1–6 is a gimbal mechanism 10 which is specifically adapted to be angularly positionable about multiple axes of orientation as well as laterally positionable relative to a mounting surface 54 upon which the gimbal mechanism 10 may be mounted. The gimbal mechanism 10 may be used to mount a variety of objects including, but not limited to, a camera lens 50 such that the camera lens 50 is easily adjustable over a wide field of view.

In its broadest sense, the gimbal mechanism 10 is comprised of a support stand 12, an outer frame 26 and an inner frame 36. The support stand 12 may be mounted to the mounting surface 54 such as a wall or a ceiling of a building. However, the support stand 12 may be mounted to any suitable mounting member. The outer frame 26 is nested within and is pivotally connected to the support stand 12. The inner frame 36 is nested within and is pivotally connected to the outer frame 26. A substrate 46 may be fixedly mounted to the inner frame 36. The substrate 46 may comprise a circuit board 48 having the camera lens 50 mounted thereon although the substrate 46 may comprise any article. Importantly, the gimbal mechanism 10 is configured such that the inner frame 36 is pivotable about an axis that is oriented perpendicularly to an axis about which the outer frame 26 is pivotable.

Referring to FIGS. 1–6, the support stand 12 may comprise a pair of legs 14 disposed in spaced parallel relation to one another. Each one of the legs 14 may comprise an elongate first member 16. Additionally, the inner frame 36 may include an elongate second member 20 which is connected or joined to a first member 16. The second member 20 may extend laterally outwardly from the first member 16. More particularly, the second member 20 may be oriented perpendicularly relative to the first member 16 from which it extends. However, each one of the second members 20 may be oriented at any angle relative to the first member 16.

Figure 6:
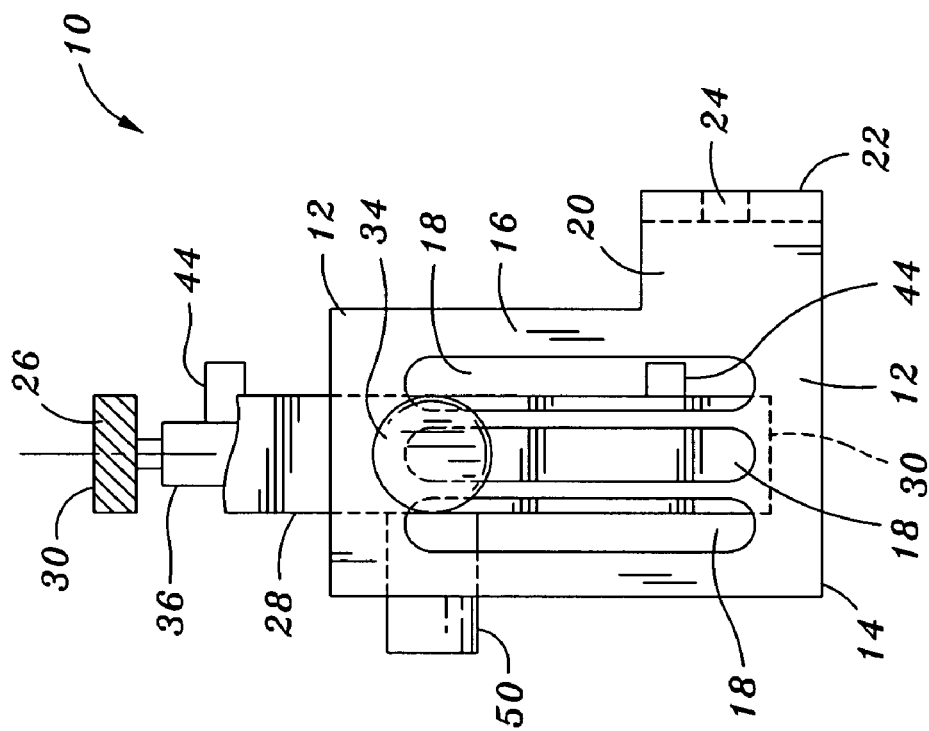
FIG. 6 is a side view of the gimbal mechanism and illustrating a plurality of the first slots being formed in the first member.

Importantly, each one of the first members 16 may have at least one first slot 18 formed therethrough as is shown in FIG. 2. Optionally, each one of the first members 16 may have a plurality of first slots 18 formed therein with each one of the first slots 18 in each of the first members 16 being aligned in generally spaced, parallel relation to one another as is shown in FIG. 6. The first slot 18 may be disposed in general alignment with the first member 16 as shown in FIGS. 1–6. The first slot 18 may extend at least partially along the length of the first member 16. Alternatively, the first slot 18 may extend substantially along an entire length of the first member 16. In addition, the first slot 18 may also be generally centered within a width of the first member 16 although the first slot 18 may be offset toward one of opposing edges of the first member 16.

The gimbal mechanism 10 further comprises the square shaped outer frame 26 which is nested within the support stand 12 and is pivotally engaged thereto by means of a pair of mechanical fasteners 34. The outer frame 26 includes a spaced pair of outer frame sides 28 which are integrally formed with, joined or otherwise connected to a spaced pair of outer frame ends 30. Each one of the outer frame sides 28 is pivotally engageable to one of the first slots 18 of an adjacent one of the first members 16. In this manner, the outer frame 26 may be selectively angularly positioned relative to the support stand 12 about an outer frame axis A.

For configurations of the support stand 12 wherein each one of first members 16 has a plurality of the first slots 18 formed therein, the outer frame 26 may be transversely re-positioned relative to the support stand 12 by removing the mechanical fasteners 34, moving the outer frame 26 into alignment with an alternative one of the first slots 18, and then reinstalling the mechanical fasteners 34 through the alternative one of the first slots 18 and into engagement with the outer frame 26. The outer frame 26 is also configured to be slidable within the length of the first slots 18. Such slidable movement of the outer frame 26 within the first slots 18 allows the outer frame 26 to be selectively laterally positioned along the length of the first slots 18. Such lateral positionability facilitates the orientation of the camera lens 50 about a wide field of view, as will be described in greater detail below.

The gimbal mechanism 10 further comprises the square shaped inner frame 36 which is nested within the outer frame 26. Similar to the configuration of the outer frame 26, the inner frame 36 has a spaced pair of inner frame ends 40 which are connected, joined or integrally formed with a spaced pair of inner frame sides 38. Each one of the inner frame ends 40 is pivotally engageable to an adjacent one of the outer frame ends 30. In this manner, the inner frame 36 may be selectively angularly adjusted relative to the outer frame 26 about an inner frame axis B. As may be apparent by reference to the Figures and as was mentioned above, the inner frame axis B and outer frame axis A are mutually perpendicularly oriented relative to one another.

Referring now to FIG. 3, attachment of the outer frame 26 to the support stand 12 may be facilitated by the pair of mechanical fasteners 34. Each one of the mechanical fasteners 34 may preferably be generally configured as a screw such as a thumbscrew which passes through the first slot 18 and engages an adjacent one of the first members 16. A threaded hole 32 may be formed substantially mid-way along each one of the outer frame sides 28. In this manner each one of the screws may pass through the first slot 18 and engage the threaded hole 32 of the adjacent one of the first members 16. Preferably, each one of the mechanical fasteners 34 is operative to cause slight relative axial motion between at least one of the first members 16 and the adjacent one of the outer frame sides 28. Such slight relative axial motion may facilitate frictional engagement of the first members 16 to the outer frame sides 28 when the mechanical fastener 34 is tightened. In this manner, the first members 16 may be locked to the outer frame side 28 so as to maintain the angular and lateral position of the outer frame 26 relative to the support stand 12 after the outer frame 26 is adjusted.

Although the mechanical fastener 34 is shown and described as being configured as a screw or thumbscrew, it is contemplated that the mechanical fastener 34 may be provided in a wide variety of alternative configurations. For example, the mechanical fastener 34 may be provided as a cam locking mechanism. Regardless of the specific configuration of the mechanical fastener 34, the gimbal mechanism 10 is preferably configured such that the angular and lateral positioning of the outer frame 26 relative to the support stand 12 is maintained by frictional engagement of at least one of the first members 16 to the adjacent one of the outer frame sides 28.

Referring still to FIG. 1, the gimbal mechanism 10 may further comprise a pair of pivot mechanisms 42 with each one of the pivot mechanisms 42 being configured to pivotally connect or engage at least one of the inner frame ends 40 with an adjacent one of the outer frame ends 30. In this manner the pivot mechanism 42 may maintain a desired angular position of the inner frame 36 relative to the outer frame 26. As shown in FIG. 1, the pivot mechanisms 42 may be interposed between adjacent ones of the inner frame ends 40 and outer frame ends 30. It is contemplated that the pivot mechanisms 42 are sized and configured to provide a relatively constant frictional force between the inner frame ends 40 and the outer frame ends 30. Unlike the mechanical fasteners 34 connecting the first members 16 to the outer frame sides 28 wherein the frictional force is dependent upon manual adjustment (i.e., tightening or loosening) of the mechanical fasteners 34, the frictional force of the pivot mechanism 42 is relatively constant such that the inner frame 36 may be angularly positioned relative to the outer frame 26 without the need for manual adjustment.

Regarding the specific configuration of the pivot mechanisms 42, it is contemplated that each one of the pivot mechanisms 42 may comprise a disk-shaped member formed of polymeric, metallic or other suitable material. Each one of the disk-shaped members may include an axle passing therethrough. Alternatively, the axle may be integrally formed with the disc-shaped member or it may be a separate component. The axle may be received into holes formed in the outer frame ends 30 and inner frame sides 38 such that the inner frame 36 is pivotally supported by the pivot mechanisms 42. Such holes may preferably be formed approximately midway along the outer frame ends 30 and approximately midway along the inner frame ends 40 although the holes may be formed at any location thereaolong.

A spacing between the outer frame ends 30 is preferably slightly larger than a width of the inner frame 36 as measured across the inner frame ends 40. Likewise, a spacing between the first members 16 is preferably slightly larger than a width of the outer frame 26 as measured across the outer frame sides 28. However, the relative sizing of the inner frame 36 and the outer frame 26 may be varied to suit the requirements of the intended application. The disk-shaped member may be provided in a thickness that allows for a relatively snug fit between the disk-shaped member and the inner and outer frames 36, 26. The thickness of the disk-shaped member as well as the specific composition of the material of which the disk-shaped member is formed may be such that an appropriate amount of frictional force is generated between the inner frame ends 40 and the adjacent one of the outer frame ends 30 such that the angular position of the inner frame 36 is generally fixedly maintainable relative to the outer frame 26 once adjusted.

As shown in FIGS. 1–6, the gimbal mechanism 10 may further comprise an elongate base member 22 extending between the second members 20. The base member 22 may be integrally formed with, connected to or generally joined to the second members 20. As shown, the base member 22 is preferably interposed between and oriented perpendicularly relative to the second members 20 although the base member 22 may be disposed at any orientation relative to the second members 20. Importantly, at least one base slot 24 and, more preferably, a pair of elongate base slots 24 may be formed in the base member 22. The base slots 24 may extend along a length of the base member 22. The base slots 24 may be generally aligned along the length of the base member 22 and may be disposed in end-to-end relationship with one another although alternative orientations of the base slots 24 are contemplated. Furthermore, the base slots 24 may be generally centered within a width of the base member 22 or the base slots 24 may be offset toward one of opposing edges of the base member 22.

Advantageously, the base slots 24 facilitate mounting of the gimbal mechanism 10 to the mounting surface 54 such as a wall or a ceiling or any other suitable mounting structure. A pair of mechanical fasteners such as mounting screws 52 may be extended through the base slots 24 and into the mounting surface 54 in order to fixedly mount the gimbal mechanism 10 to the mounting surface 54. In this manner, the base slots 24 may facilitate lateral positioning of the gimbal mechanism 10 relative to the mounting surface 54. More specifically, the lateral positioning of the support stand 12 relative to the mounting surface 54 may be adjusted by loosening the mounting screws 52, laterally moving the support stand 12 relative to the support surface, and then retightening the mounting screws 52 in order to rigidly secure the base member 22 to the mounting surface 54.

Regarding materials and processes which may be used to fabricate the gimbal mechanism 10, it is contemplated that the support stand 12, the outer frame 26 and the inner frame 36 may each be formed of a metallic material using any one of a variety of fabricating techniques such as machining, casting, or metal injection molding. Alternatively, polymeric material such as plastic or fiberglass may also be used to fabricate the support stand 12, the outer frame 26 and the inner frame 36. In this regard, it should be noted that the gimbal mechanism 10 may be formed of any suitable material having the necessary strength, durability and produceablility characteristics. It is contemplated that the first and second members 16, 20 and the base member 22 of the support stand 12 may be integrally formed as a unitary structure. Likewise, the inner and outer frames 36, 26 may also be formed as unitary structures.

As was previously mentioned, the inner frame 36 may have the substrate 46 mounted thereon. In addition, the substrate 46 may be configured as the circuit board 48 which is shown in FIGS. 1–6. As can be seen in FIGS. 2 and 6, on each corner of the inner frame 36, a boss 44 may be formed to provide a mounting surface 54 for the substrate 46. As shown in FIG. 2, the bosses 44 may be formed as raised portions adjacent the corners of the inner frame 36. As shown in FIG. 6, the bosses may be cylindrically shaped and may be located at an offset distance from the respective one of the corners. Furthermore, the bosses 44 may be integrally-formed extensions of the inner frame 36 or the bosses 44 may be separate components that are attached to the inner frame 36. Although the bosses are shown as shaped in FIGS. 2 and 6, it is contemplated that the bosses 44 may be formed in wide variety of shapes, sizes and configurations. For example, the bosses 44 as shown in FIG. 6 may be formed at a relatively greater height than that shown in FIG. 2 such that the circuit board 48 may be spaced at a relatively greater distance from the inner frame 36.

A threaded hole 32 may be included in each one of the bosses 44. Mechanical fasteners may be extended through the circuit board 48 and into the threaded holes 32 to secure the circuit board 48 to the inner frame 36, as is shown in the FIGS. 1–6. However, a variety of alternative means may be used for securing the circuit board 48 to the inner frame 36. In addition, the substrate 46 may be configured in a variety of alternative configurations in addition to the circuit board 48 shown in the Figures. For example, the substrate 46 may be used to mount a lighting fixture such that the directional orientation of the lighting fixture may be readily adjusted by manipulating the fastener mechanisms and the pivot mechanisms 42. Furthermore, a variety of articles other than the substrate 46 may be mounted to the inner frame 36.

The operation of the gimbal mechanism 10 will now be described with reference to FIGS. 1–6. For applications wherein the gimbal mechanism 10 is used to mount the camera lens 50 such as a surveillance camera lens for tracking, observing and recording activity in a retail establishment, the base member 22 may be mounted to a wall or ceiling of the building. As was previously mentioned, mounting screws 52 may be extended through the base slots 24 and into the mounting surface 54 such as into the wall of the building. The base member 22 may be oriented according to the desired direction of lateral adjustability of the gimbal mechanism 10 relative to the mounting surface 54. Once initially positioned, the base member 22 may be securely fastened to the mounting surface 54.

With the outer frame 26 being pivotally engaged to the support stand 12 via the mechanical fasteners 34 (i.e., thumbscrews) and the inner frame 36 being pivotally engaged to the outer frame 26 via the pivot mechanisms 42, the outer and inner frames 26, 36 may be easily adjusted about respective ones of the outer frame 26 and inner frame axis B. The camera lens 50 may then be directed toward the area to be observed. The direction of orientation of the camera lens 50 may be adjusted according to areas where suspicious activity is likely to occur. For example, in a retail situation where the area under surveillance is limited to an area surrounding a cash register, the gimbal mechanism 10 may be directed such that the cash register is in the center of the field of view.

In a situation where the area under surveillance is relocated, the gimbal mechanism 10 may be accordingly reoriented via lateral and angular repositioning of the inner and outer frames 36, 26 relative to each other and relative to the support stand 12. For example, in the case where a cash register of a retail establishment is moved to a different area of the establishment, the gimbal mechanism 10 may be manually adjusted and re-oriented with regard to the specific orientation of the camera lens 50. The inner frame 36 may be pivoted about the inner frame axis B to an alternative angular orientation relative to the outer frame 26.

In addition, the outer frame 26 may be pivoted about the outer frame axis A to an alternative angular position relative to the support stand 12. Furthermore, the outer frame 26 may be laterally repositioned within limits of the first slots 18. Referring to FIG. 6, for configurations of the support stand 12 wherein each one of first members 16 has a plurality of the first slots 18, the outer frame 26 may be transversely re-positioned relative to the support stand 12 by removing the mechanical fasteners 34, moving the outer frame 26 into alignment with an alternative one of the first slots 18, and then reinstalling the mechanical fasteners 34. Angular and lateral repositioning may be effectuated by loosening the mechanical fasteners 34 pivotally connecting the outer frame 26 to the support stand 12.

Once the mechanical fasteners 34 are loosened, the outer frame 26 may be laterally slid within the first slots 18 to the desired lateral position relative to the support stand 12. In addition, the outer frame 26 may be angularly positioned or rotated relative to the first member 16. Once the outer frame 26 is laterally and angularly positioned in the desired location, the mechanical fasteners 34 may be tightened to cause frictional engagement between the outer frame sides 28 and first members 16. In this manner, the outer frame 26 may be angularly and laterally locked to the support stand 12.

The inner frame 36 may be positioned by simply angularly rotating the inner frame 36 about the inner frame axis B relative to the outer frame 26. As previously mentioned, the configuration of the pivot mechanisms 42 is preferably such that a constant frictional force is provide between the inner frame ends 40 and an adjacent one of the outer frame ends 30 in order to maintain the angular position of the inner frame 36 relative to the outer frame 26.

Furthermore, the lateral position of the base member 22 relative to the mounting surface 54 may be easily adjusted by first loosening the mounting screws 52 securing the base member 22 to the mounting surface 54, sliding the base member 22 laterally to the desired position, and then retightening the mounting screws 52 to fixedly secure the support stand 12 to the mounting surface 54. Using the above described procedure, the gimbal mechanism 10 of the present invention provides the means for easily adjusting the field of view of the camera lens 50.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:
1. A gimbal mechanism, comprising:
a support stand having a pair of legs disposed in spaced parallel relation to one another, each one of the legs including an elongate first member joined to an elon- gate second member extending laterally outwardly therefrom, each one of the first members having a first slot formed therethrough;

a square-shaped outer frame nested within the support stand and having a spaced pair of outer frame sides joined to a spaced pair of outer frame ends, each one of the outer frame sides being pivotally engagable to the first slot of an adjacent one of the first members such that the outer frame may be selectively angularly positioned relative to the support stand about an outer frame axis, the outer frame being slidable within and laterally positionable along a length of the first slots; and a square-shaped inner frame nested within the outer frame and having a spaced pair of inner frame ends joined to a spaced pair of inner frame sides, each one of the inner frame ends being pivotally engagable to an adjacent one of the outer frame ends such that the inner frame may be selectively angularly adjusted relative to the outer frame about an inner frame axis.

2. The gimbal mechanism of claim 1 wherein each one of the second members is oriented perpendicularly relative to the first member from which it extends.

3. The gimbal mechanism of claim 1 wherein the first slot extends at least partially along a length of the first member.

4. The gimbal mechanism of claim 1 wherein each one of the first members has a plurality of the first slots formed therethrough.

5. The gimbal mechanism of claim 1 further comprising a pair of mechanical fasteners, each one of the mechanical fasteners passing through the first slot and engaging an adjacent one of the first members.

6. The gimbal mechanism of claim 5 wherein the mechanical fastener is operative to cause slight relative axial motion between and frictional engagement of at least one of the first members to the adjacent one of the outer frame sides for locking the angular and lateral position of the outer frame relative to the support stand.

7. The gimbal mechanism of claim 6 wherein:
each one of the outer frame sides includes a threaded hole disposed approximately midway therealong;
each one of the mechanical fasteners being configured as a screw passing through the first slot and engaging the threaded hole of an adjacent one of the first members.

8. The gimbal mechanism of claim 1 further comprising a substrate mounted on the inner frame.

9. The gimbal mechanism of claim 8 wherein the substrate is configured as a circuit board.

10. The gimbal mechanism of claim 9 further comprising a camera lens mounted on the circuit board.

11. The gimbal mechanism of claim 1 further comprising an elongate base member extending between and joining the second members.

12. The gimbal mechanism of claim 11 wherein the base member includes a pair of elongate base slots extending along a length thereof and disposed in end-to-end relationship with one another for laterally positioning the support stand relative to a mounting surface.

13. The gimbal mechanism of claim 1 further comprising a pair of pivot mechanisms, each one of the pivot mechanisms being operative to engage at least one of the inner frame ends with an adjacent one of the outer frame ends such that the pivot mechanisms maintain an angular position of the inner frame relative to the outer frame.

14. The gimbal mechanism of claim 1 wherein a spacing between the first members is substantially equivalent to a width of the outer frame as measured across the outer frame sides.

15. The gimbal mechanism of claim 1 wherein a spacing between the outer frame ends is substantially equivalent to a width of the inner frame as measured across the inner frame ends.

16. A gimbal mechanism, consisting of:
a support stand having a pair of legs disposed in spaced parallel relation to one another, each one of the legs including an elongate first member joined to an elongate second member extending perpendicularly outwardly therefrom, each one of the first members having three first slots disposed in spaced relation to one another, the support stand further including an elongate base member extending between and joining the second members, the first and second members and base member being integrally formed as a unitary structure;

a square-shaped outer frame nested within the support stand and having a spaced pair of outer frame sides integrally formed with a spaced pair of outer frame ends, each one of the outer frame sides being pivotally engagable to one of the first slots of an adjacent one of the first members such that the outer frame may be selectively angularly positioned relative to the support stand about an outer frame axis, the outer frame being slidable within and laterally positionable along a length of the first slots; and a square-shaped inner frame nested within the outer frame and having a spaced pair of inner frame ends integrally formed with a spaced pair of inner frame sides, each one of the inner frame ends being pivotally engagable to an adjacent one of the outer frame ends such that the inner frame may be selectively angularly adjusted relative to the outer frame about an inner frame axis.

17. The gimbal mechanism of claim 16 wherein the first slots extends at least partially along a length of the first member.

18. The gimbal mechanism of claim 16 wherein:
the support stand includes a pair of mechanical fasteners;
each one of the outer frame sides includes a threaded hole disposed approximately midway therealong;
each one of the mechanical fasteners passing through one of the first slots and engaging the threaded hole of an adjacent one of the first members;
each one of the mechanical fasteners being operative to cause slight relative axial motion between and frictional engagement of the first members to the outer frame sides for locking the angular and lateral position of the outer frame relative to the support stand.

19. The gimbal mechanism of claim 16 wherein:
the inner frame includes a circuit board mounted thereon;
the circuit board having a camera lens mounted thereon.

20. The gimbal mechanism of claim 16 wherein the base member includes a pair of elongate base slots extending along a length thereof and disposed in end-to-end relationship with one another for laterally positioning the support stand relative to a mounting surface.

21. The gimbal mechanism of claim 16 wherein the inner frame includes a pair of pivot mechanisms, each one of the pivot mechanisms being operative to engage at least one of the inner frame ends with an adjacent one of the outer frame ends such that the pivot mechanisms maintain an angular position of the inner frame relative to the outer frame.

* * * * *